United States Patent [19]

Sweet et al.

[11] 4,136,893
[45] Jan. 30, 1979

[54] MOTION DAMPER FOR A WALKING BEAM ASSEMBLY

[75] Inventors: Philip J. Sweet; Buck C. Hamlet; David L. Sweet, all of Fresno, Calif.

[73] Assignee: American Carrier Equipment, Inc., Fresno, Calif.

[21] Appl. No.: 801,768

[22] Filed: May 31, 1977

[51] Int. Cl.² .............................................. B60G 5/02
[52] U.S. Cl. .................................................... 280/678
[58] Field of Search ............... 280/680, 676, 677, 678, 280/679, 706, 711, 713; 267/65 D

[56] References Cited

U.S. PATENT DOCUMENTS

| | | | |
|---|---|---|---|
| 3,007,713 | 11/1961 | Schilberg | 280/680 |
| 3,140,880 | 7/1964 | Masser | 280/713 |
| 4,033,607 | 7/1977 | Cameron | 267/65 D |

Primary Examiner—Robert R. Song
Attorney, Agent, or Firm—Huebner & Worrel

[57] ABSTRACT

An improved suspension system for tandem axle vehicles characterized by a horizontally oriented frame, a pair of live axles, and a pair of walking beam assemblies disposed beneath the frame of the vehicles interconnecting the axles, and a pair of air springs mounted on at least one of the axles and connected to the frame for damping highway-induced motion imparted to the walking beams, and a manually operable pneumatic circuit for selectively pressurizing the air springs for dissipating harmonic motion.

1 Claim, 4 Drawing Figures

MOTION DAMPER FOR A WALKING BEAM ASSEMBLY

BACKGROUND OF THE INVENTION

1. Field of the Invention

As can be fully appreciated by those familiar with the use and operation of walking beam assemblies of the type frequently referred to as "single point" walking beam assemblies, which afford independent vertical motion of each axle of a pair of tandem axles, walking beams tend to experience harmonic motion about their pivot points. This motion becomes particularly significant where a vehicle is operated over long distances at high speeds, since harmonic motion induced by a highway surface results in the vehicle as well as its operator suffering effects of severe fatigue.

2. Description of the Prior Art

Heretofore, no known successful attempt has been made to damp out harmonic motion induced in the walking beam of a suspension system. However, it has been discovered by the instant inventors that by combining variably pressurized air springs with walking beam assemblies, it is possible to greatly reduce if not totally eliminate oscillatory harmonic motion of the walking beam, particularly where the air springs are selectively pressurized through a manipulation of pressure control valves.

It is therefore the purpose of the instant invention to provide in a system for a vehicle characterized by a pair of independently supported axles arranged in tandem and connected through walking beam assemblies extended therebetween, the improvement comprising manually controlled pneumatic means for damping highway-induced harmonic motion in vehicular suspension systems.

OBJECTS AND SUMMARY OF THE INVENTION

It is therefore an object of the instant invention to provide an improved vehicular suspension system.

It is another object to provide snubbing means for damping highway-induced motion of a single point walking beam assembly for a tandem axle vehicle.

It is another object to provide in a suspension system for a vehicle characterized by a pair of independently supported axles arranged in tandem and connected through walking beam assemblies, the improvement comprising snubbing means for damping highway-induced harmonic motion of the walking beam assemblies.

It is another object to provide an improved suspension system for a vehicle having tandem axles interconnected through walking beam suspension assemblies at least one pressurized air bag for reducing simultaneously induced opposed motion for the axles.

Another object is to provide an improved suspension system which is particularly useful in connection with dissipating harmonic motion imparted to a suspension system characterized by walking beam assemblies for a tandem wheel vehicle having live axles arranged in tandem, although not necessarily restricted in use thereto, since the instant invention may be similarly useful when installed in suspension assemblies for trailers and the like.

These and other objects and advantages are achieved through the use of an improved suspension system for a tandem axle vehicle characterized by a horizontally oriented frame, a pair of live axles extended transversely of the frame and arranged in mutually spaced parallelism, and a pair of single point walking beam assemblies disposed beneath the frame of the vehicle in mutually spaced parallelism, each having a walking beam extended in interconnecting relation with the axles of the pair of axles and pivotally coupled with a leaf spring assembly comprising a pair of selectively pressurized air bags of an air spring assembly mounted on one axle and connected with the frame of the vehicle for damping highway-induced motion, and a pneumatic circuit for selectively pressurizing the air bags including a manipulatable valve mounted in the cab of the vehicle whereby the operator of the vehicle may selectively pressurize the air bags for thus damping highway-induced harmonic motion of the axles.

DESCRIPTION OF THE PREFERRED EMBODIMENT

Figure 1:
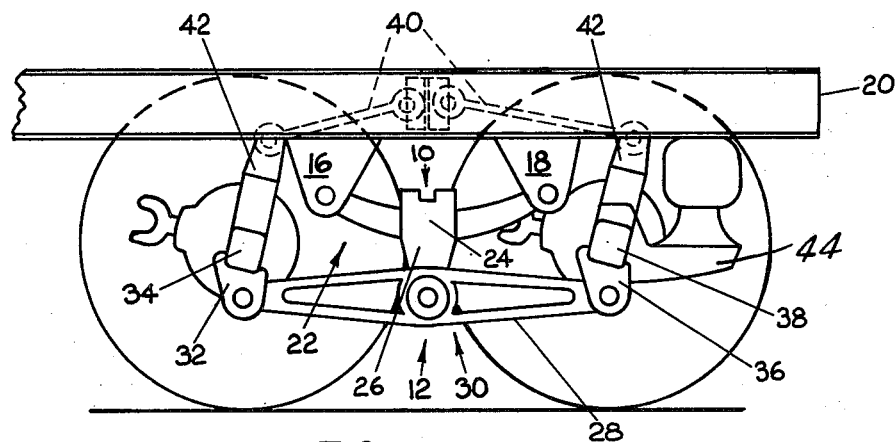
FIG. 1 comprises a side elevational view of a suspension system for a vehicle characterized by a pair of independently supported axles arranged in tandem and connected through a walking beam assembly, and an air spring assembly, including a variably pressurized air bag for damping highway-induced harmonic motion, which embodies the principles of the instant invention.

Referring now to the drawings with more particularity, there is shown in FIG. 1 an improved suspension system, generally designated 10, which embodies the principles of the instant invention.

It is to be understood that the suspension system 10 is of a generally symmetric construction and includes a pair of walking beam assemblies 12 of similar design and construction. These assemblies are mounted beneath the opposite sides of a frame, generally designated 14, for a given tandem axle vehicle, not shown. Of course, walking beam assemblies are well known. Moreover, since the suspension system 10 is symmetric in design, a detailed description of one side thereof is deemed adequate to provide for a complete understanding of the instant invention.

Turning now to FIG. 1, it can be seen that the walking beam assembly 12 includes a front shackle 16 and a rear shackle 18 welded or otherwise rigidly affixed in fore and aft alignment, as determined by the direction of vehicular travel, to a longitudinal frame member 20 provided for the vehicle. Additionally, a leaf spring assembly 22, connected at its leading end to the front shackle 16 and supported at its rear end by the rear shackle 18, is provided. Midway of the leaf spring assembly 22, there is mounted a saddle 24 from which is suspended a pivot post 26.

To the lowermost end of the pivot post 26, there is pivotally connected a walking beam 28 of a substantially elongated configuration, arranged in fore and aft orientation. The walking beam 28, as a practical matter, is connected with the pivot post 26 through a suitable trunion, generally designated 30.

It will be noted that the walking beam 28 extends in substantial parallelism with the frame member 20 and is pivotally connected through a suitable coupling 32 to the front axle 34 and similarly connected through a coupling 36 to the rear or trailing axle 38 of the tandem axle assembly. It is to be understood that since walking beam assemblies are well known, the particular manner in which the walking beam 28 is connected with the pivot post 26 and the axles 34 and 38 is varied as desired. Therefore, a more detailed description of the manner in which the walking beam 28 is connected with the pivot post 26 in supporting relation with the leaf spring assembly 22 and the front and rear axles 34 and 38 is omitted in the interest of brevity. Additionally, it will be appreciated that the front and rear axles are supported by radius rods 40 pivotally connected to the frame member 20 and to the front and rear axles through links 42. A more detailed description of the particular manner in which the radius rods 40 are connected with the axles 34 and 38 is omitted also in the interest of brevity.

Figure 2:
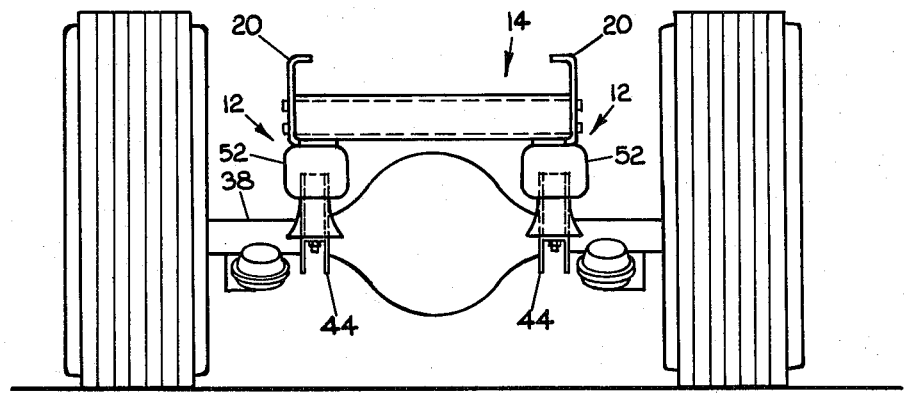
FIG. 2 is a rear elevational view of the suspension system shown in FIG. 1.

Turning for a moment to FIG. 2, it can be seen that there is provided in coupled relation with the walking beam assemblies an air spring assembly, not designated, the purpose of which is to serve as a motion snubbing assembly. The air spring assembly includes, in mutually spaced relation, a pair of cantilevered brackets 44 welded or otherwise rigidly affixed to the rear axles 38. Each of the brackets 44 includes a body 46, FIG. 3, welded at its root 48 to the housing 50 of the axle 38, FIG. 3. It is important to note that the brackets 44 extend rearwardly in substantial parallelism with the frame members 20. Thus the brackets are disposed in coplanar relation and move in vertical planes simultaneously as vertical motion is imparted to the axle 38.

Mounted on the upper surface of the body 46 of each of the brackets 44, there is an air bag 52. Each of the air bags 52, as a practical matter, is provided with a base 54, of known design, through which coupling of the air bag 52 and the supporting bracket 44 is facilitated. Seated on the upper surface of the air bag 52 is a cross member 56 through which the air bags are connected with the frame members 20. Interposed between the lowermost surface of the cross member 56 and the upper surface of each of the air bags 52, there is a plate 58, the purpose of which is to assure a proper seating of the cross member on the upper surface of the air bag. As a practical matter, each of the air bags 52 is connected with a bracket 44 and the cross member 56 utilizing a plurality of suitable bolts 60.

While the particular technique employed in connecting the air bags 52 with the brackets 44 and the cross member 56 is varied as desired, bolts 60 serve quite satisfactorily for this purpose. However, it is to be understood that the air bags 52 are affixed to the frame 20 through the cross member 56, and to the rear axle 38 through the brackets 44, whereby the bags necessarily undergo contraction and elongation as the axle 38 moves in opposed vertical directions relative to the frame members 20.

In order to substantially impair or even eliminate vertical motion of the rear axle 38, relative to the frame 20, the air bags 52 are commonly connected in a controllable pneumatic circuit, generally designated 62. Thus pressure for the air confined within the bags 52 is selectively varied for damping vertical motion of the rear axle 38 in order to dissipate harmonic motion simultaneously induced in the walking beam assemblies 12.

Figure 3:
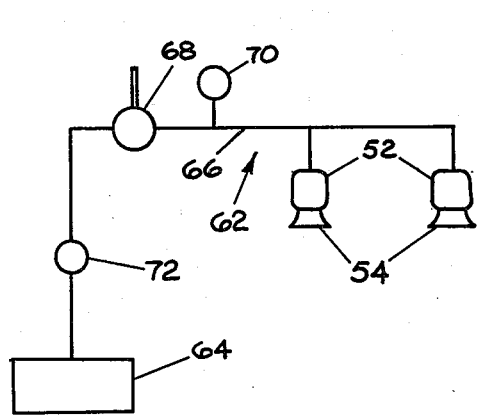
FIG. 3 is a schematic view of a circuit diagram employed for coupling the air bags to a source of air under pressure.
Figure 4:
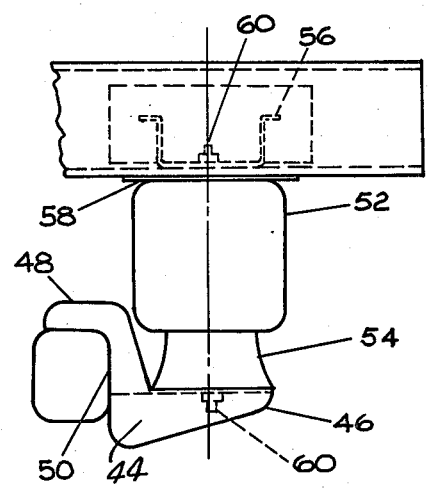
FIG. 4 is a fragmented, side elevational, differently dimensioned view of one of the air springs shown in FIGS. 1 and 2, on a slightly larger scale.

As shown in FIG. 3, the circuit 62 includes an air supply 64 of a type generally found aboard large trucks and the like. Interconnecting the air supply 64 and the bags 52 is a pneumatic conduit 66 which, as desired, includes flexible links, not designated. The conduit 66, preferably, includes a manually operable valve 68 disposed within the cab of the vehicle in an appropriate location relative to the seat, not shown, for the operator of the vehicle. The pressure admitted from the source 64 to the bag 52 is selectively controlled through manipulation of the valve 68.

As a practical matter, the valve 68 includes an air release port, not designated, through which air selectively may be bled from the bags 52, as desired. Additionally, an air gauge 70 is, where desired, connected between the valve 68 and the bags 52 in order to assure that pressures within the bags do not exceed a magnitude deemed excessive for operational purposes. Also, a safety valve 72 is provided between the air supply 64 and the valve 68, in order to assure that the system is adequately protected.

OPERATION

It is believed that in view of the foregoing description of the invention, the operation of the device is clearly apparent. However, for the sake of assuring a complete understanding of the invention, the operation thereof will be at this point briefly reviewed.

With the suspension system 10 assembled in the manner hereinbefore described, it is to be understood that as the vehicle progresses along a highway, particularly in its empty condition, the wheels thereof tend to experience surface-rebound which ultimately results in an induction of harmonic motion in the suspension system. Thus the walking beam assemblies 12 tend to experience excessive oscillation about a horizontal axis, herein referred to as harmonic motion.

In order to damp out induced harmonic motion employing the instant invention, the operator of the vehicle simply opens the valve 68, manually, permitting air to pass through the conduit 66, from the air supply 64, to the bags 52. As the bags 52 are thus pressurized, the throw of the walking beams 28 is reduced, whereupon the extent to which the axles 34 and 38 move in vertical planes is reduced. By continuing to pressurize simultaneously the air bags 52 of the air spring, through a selective manipulation of the valve 68, it is possible to substantially eliminate all pivotal motion of the walking beam 28. Thus highway-induced harmonic motion is "snubbed" or dissipated through a selective manipulation of the valve 68.

Of course, simply by reducing the pressure within the bags 52, the function of the walking beam assembly in the suspension system 10 is re-established so that the axles 34 and 38 are again permitted to move simultaneously in opposite vertical directions.

In view of the foregoing, it should readily be apparent that the instant invention is embodied in a snubbing assembly through which wear and fatigue, for both a vehicle and its operator, are reduced.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. In a suspension system for a tandem axle vehicle characterized by a horizontally oriented frame, a pair of live axles extended transversely of said frame and arranged in mutually spaced parallelism, and a pair of pivotal walking beam assemblies disposed beneath the frame of the vehicle in spaced parallelism, each of said assemblies being characterized by a pivotal walking beam extended in interconnecting relation with the axles of said pair and pivotally coupled in supporting relation with a leaf spring assembly for angular movement about an axis passing through the midportion of the walking beam, as harmonic motion is imparted thereto, means for damping highway-induced harmonic motion imparted to the walking beams, comprising:

A. a pair of brackets rigidly affixed to the housing of one of said axles and projected perpendicularly therefrom in substantial parallelism with said frame; and
B. a pair of air springs, each including an air bag mounted on a projected portion of one of said brackets and connected to said frame, and means for selectively pressurizing the pair of air springs including a source of air under pressure, and circuit means connected between the air bags and the source of air under pressure for delivering air under pressure to the air springs including a manually operable valve interposed between the source and the pair of air springs.

* * * * *